(12) United States Patent
Both

(10) Patent No.: US 7,412,449 B2
(45) Date of Patent: Aug. 12, 2008

(54) FILE OBJECT STORAGE AND RETRIEVAL USING HASHING TECHNIQUES

(75) Inventor: Hans-Joachim Both, Walldorf (DE)

(73) Assignee: SAP Aktiengesellschaft, Walldorf (DE)

( * ) Notice: Subject to any disclaimer, the term of this patent is extended or adjusted under 35 U.S.C. 154(b) by 385 days.

(21) Appl. No.: 10/444,509

(22) Filed: May 23, 2003

(65) Prior Publication Data
US 2004/0236761 A1    Nov. 25, 2004

(51) Int. Cl.
    *G06F 7/00* (2006.01)
(52) U.S. Cl. .............................. 707/100; 707/7; 707/101
(58) Field of Classification Search ................. 707/100, 707/7, 101
See application file for complete search history.

(56) References Cited

U.S. PATENT DOCUMENTS

| | | | | | |
|---|---|---|---|---|---|
| 4,780,816 | A | * | 10/1988 | Connell | 711/216 |
| 5,129,074 | A | * | 7/1992 | Kikuchi et al. | 711/173 |
| 5,182,799 | A | * | 1/1993 | Tamura et al. | 711/216 |
| 5,197,002 | A | * | 3/1993 | Spencer | 705/34 |
| 5,440,732 | A | * | 8/1995 | Lomet et al. | 707/1 |
| 5,893,086 | A | * | 4/1999 | Schmuck et al. | 707/1 |
| 6,055,534 | A | * | 4/2000 | Nishino | 707/10 |
| 6,145,064 | A | * | 11/2000 | Long et al. | 711/158 |
| 6,374,266 | B1 | * | 4/2002 | Shnelvar | 707/204 |
| 6,470,345 | B1 | * | 10/2002 | Doutre et al. | 707/100 |
| 6,594,665 | B1 | * | 7/2003 | Sowa et al. | 707/10 |
| 6,772,163 | B1 | * | 8/2004 | Sinclair et al. | 707/100 |
| 6,915,302 | B1 | * | 7/2005 | Christofferson et al. | 707/102 |
| 6,934,796 | B1 | * | 8/2005 | Pereira et al. | 711/108 |
| 2003/0012558 | A1 | * | 1/2003 | Kim et al. | 386/97 |
| 2004/0220975 | A1 | * | 11/2004 | Carpentier et al. | 707/200 |

FOREIGN PATENT DOCUMENTS

| | | | |
|---|---|---|---|
| DE | 4421640 C1 | * | 8/1995 |
| JP | 2000357115 A | * | 12/2000 |

OTHER PUBLICATIONS

Ramakrishna, M. V., "File Organization Using Composite Perfect Hashing", 1989, ACM, 0362-5915/89/0600-0231, pp. 231-263.*

* cited by examiner

*Primary Examiner*—Wilson Lee
*Assistant Examiner*—Michael Le
(74) *Attorney, Agent, or Firm*—Fish & Richardson P.C.

(57) ABSTRACT

Methods and apparatus, including computer program products, for generating hash slot subdirectories within a file system, identifying each hash slot subdirectory by a unique identifier, receiving a document, hashing a name of the document to generate a hash value, selecting a hash slot subdirectory that corresponds to the hash value, generating a document subdirectory within the selected hash slot subdirectory, identifying the document subdirectory by the name of the document, and storing the document in the document subdirectory. Methods and apparatus, including computer program products, receiving a request for a document, hashing a name of the document to generate a hash value, selecting a hash slot subdirectory having a unique identifier that corresponds to the hash value, locating a document subdirectory within the selected hash slot subdirectory that is identified by the name of the document, and retrieving the document from the document subdirectory.

57 Claims, 6 Drawing Sheets

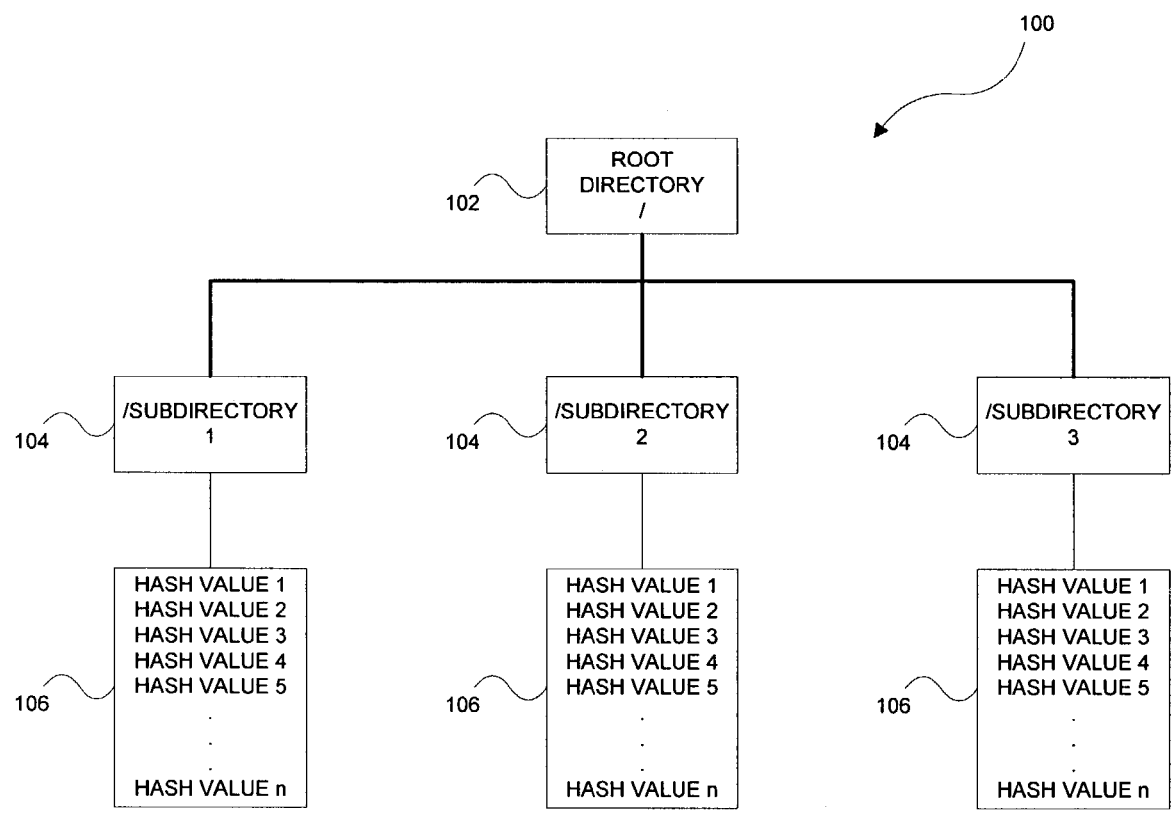
Fig._1

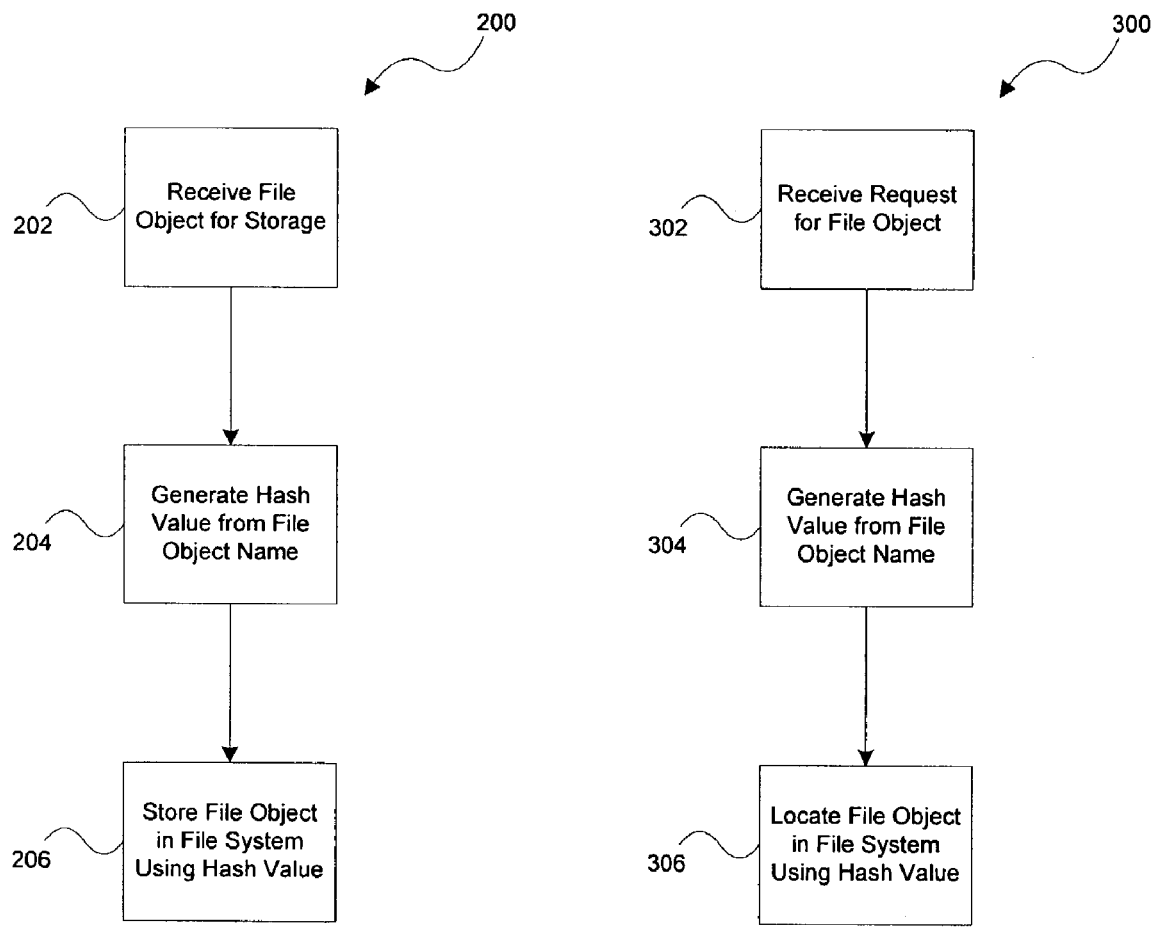
Fig._2
Fig._3

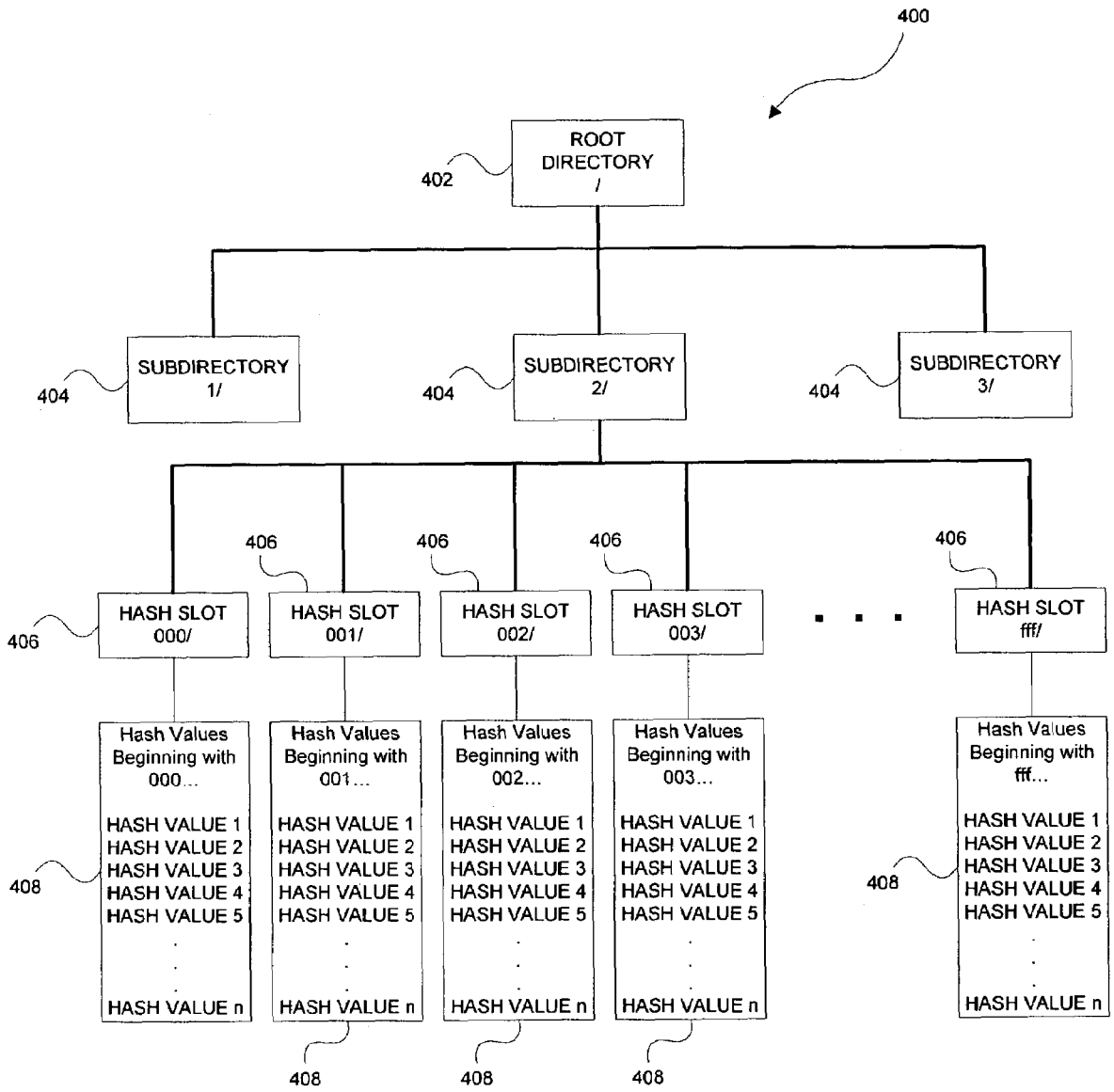
Fig._4

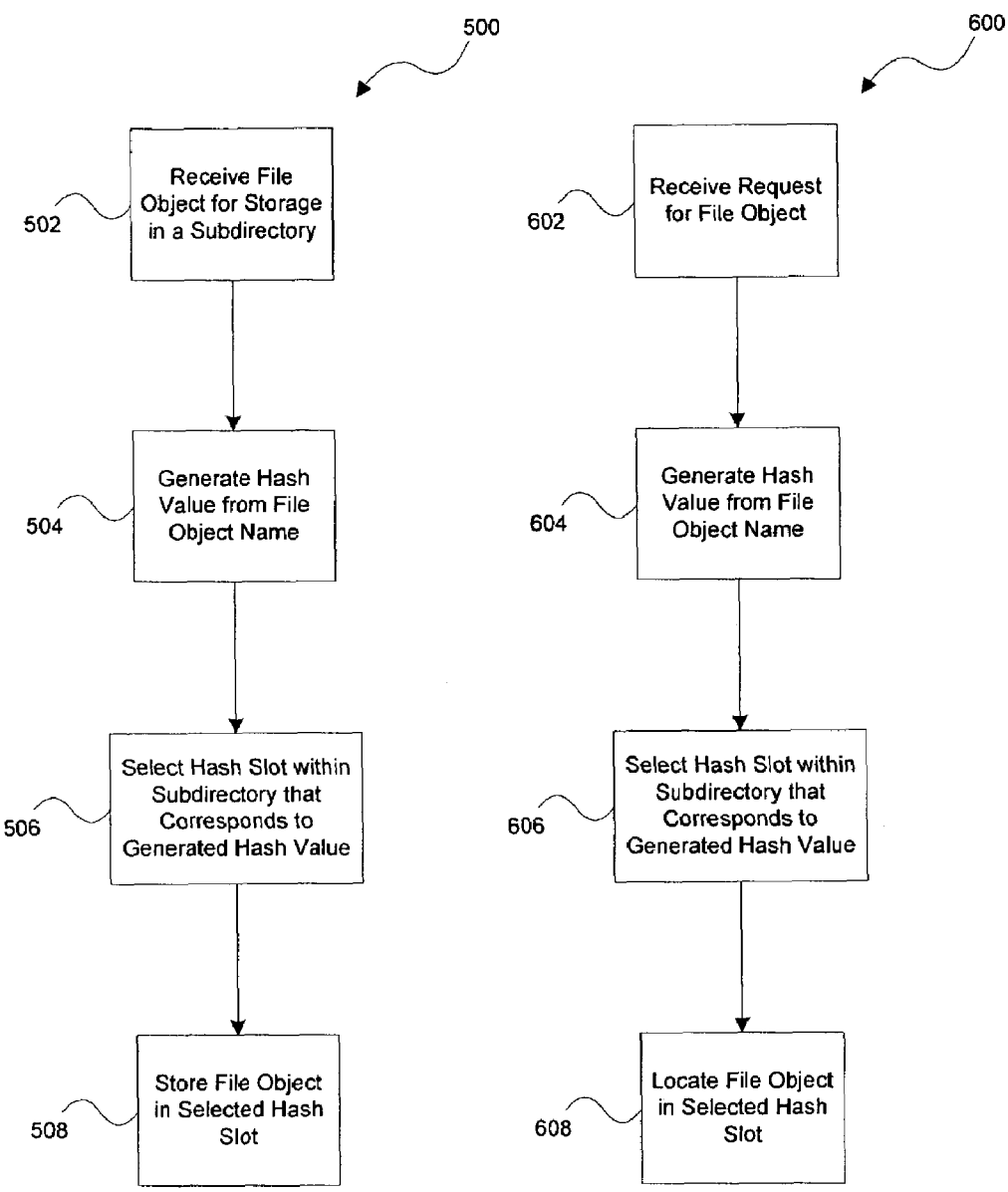
Fig._5  Fig._6

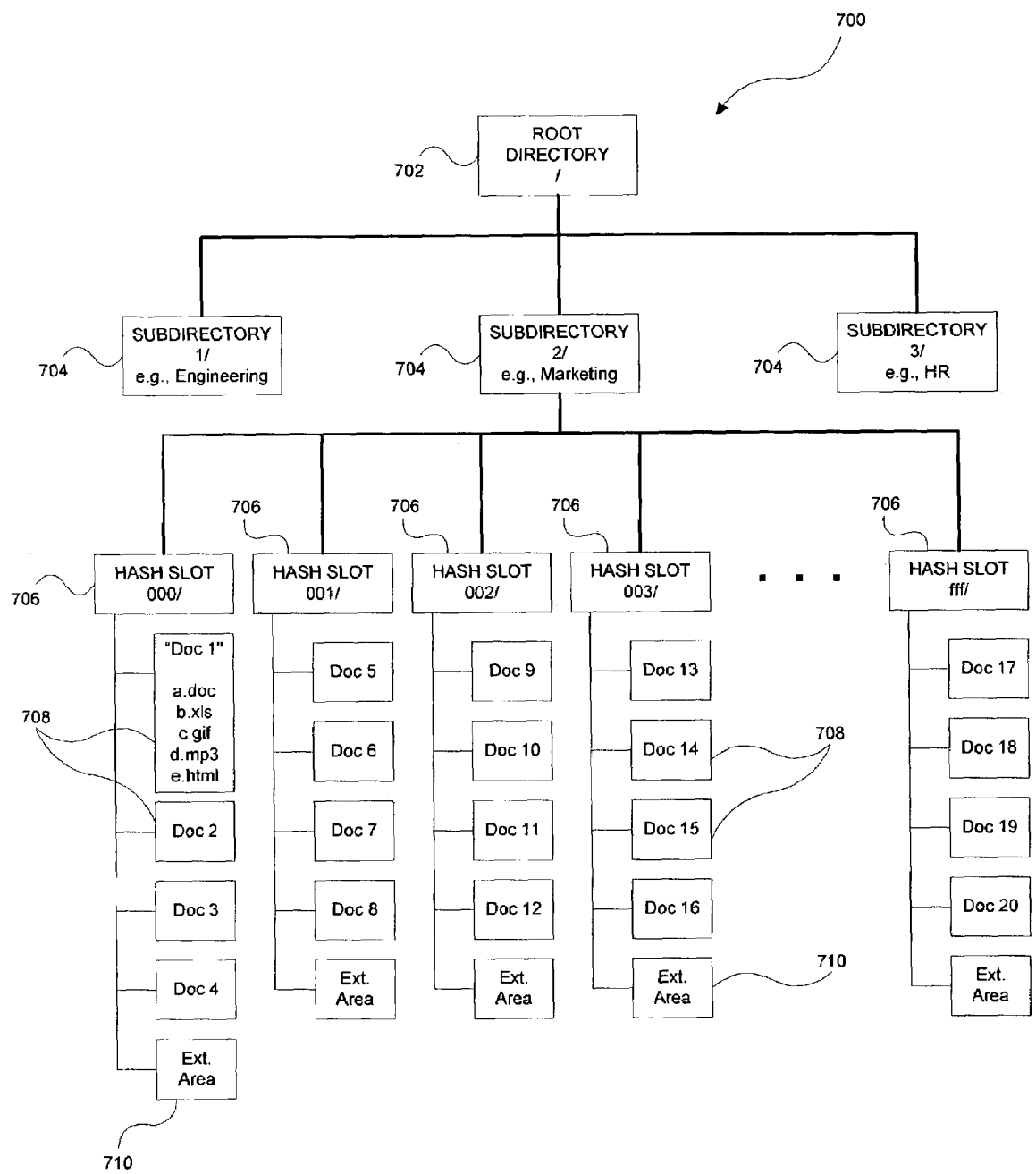
Fig._7

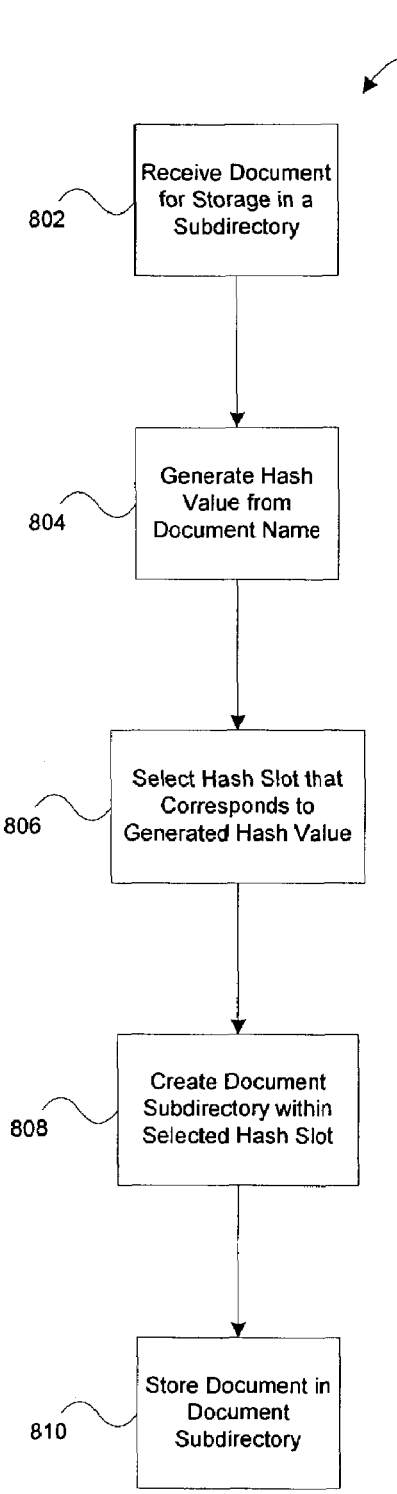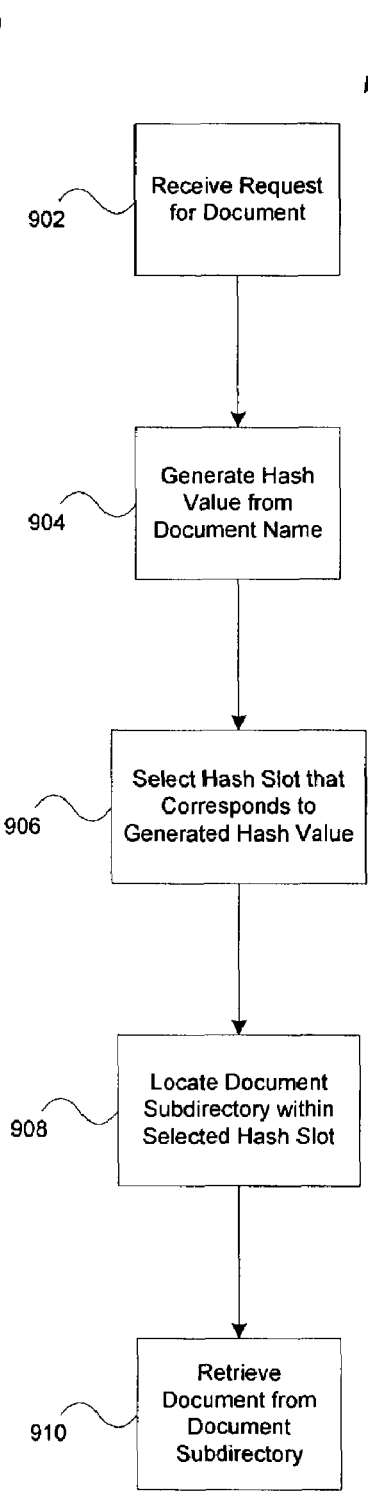
Fig._8   Fig._9

FILE OBJECT STORAGE AND RETRIEVAL USING HASHING TECHNIQUES

BACKGROUND

This invention relates to file system storage. Documents can be stored in a hierarchical or tree-structured file system. A tree structure is a method for placing and locating files (called records or keys) in a database. The method typically finds data by repeatedly making choices at decision points called nodes. A node can have as few as two branches (also called children), or as many as several dozen.

In a tree, records are stored in locations called leaves. This name derives from the fact that records always exist at end points; there is nothing beyond them. The starting point is called the root. The maximum number of children per node is called the order of the tree. The maximum number of access operations required to reach the desired record is called the depth. When a hierarchical file system is used to store millions of documents, the tree structure will become very complex and difficult to navigate.

SUMMARY

A high-performance file system enables efficient storage and retrieval of file objects and can be used on virtually any computer operating system. In accordance with an embodiment, a method for storing a file object in a computer file system comprises receiving the file object, hashing a name of the file object to generate a hash value, and storing the file object in the file system using the hash value. Similarly, a method for retrieving a file object from a computer file system comprises receiving a request for the file object, hashing a name of the file object to generate a hash value, and retrieving the file object using the hash value.

In another embodiment, a method for storing a file object in a computer file system comprises generating subdirectories within the file system, identifying each subdirectory by a unique identifier, receiving the file object, hashing a name of the file object to generate a hash value, selecting a subdirectory that corresponds to the hash value, and storing the file object in the selected subdirectory. Likewise, a method for retrieving a file object from a computer file system comprises receiving a request for the file object, hashing a name of the file object to generate a hash value, selecting a subdirectory having a unique identifier that corresponds to the hash value, and retrieving the file object from the selected subdirectory.

In yet another embodiment, a method for storing a document in a computer file system comprises generating hash slot subdirectories within the file system, identifying each hash slot subdirectory by a unique identifier, receiving the document, hashing a name of the document to generate a hash value, selecting a hash slot subdirectory that corresponds to the hash value, generating a document subdirectory within the selected hash slot subdirectory, identifying the document subdirectory by the name of the document, and storing the document in the document subdirectory. Here, a method of retrieving a document from a file system comprises receiving a request for the document, hashing a name of the document to generate a hash value, selecting a hash slot subdirectory having a unique identifier that corresponds to the hash value, locating a document subdirectory within the selected hash slot subdirectory that is identified by the name of the document, and retrieving the document from the document subdirectory.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 illustrates a structure of a file system.

FIG. 2 is a method for storing a file object using the file system of FIG. 1.

FIG. 3 is a method for retrieving a document using the file system of FIG. 1.

FIG. 4 illustrates the structure of another file system.

FIG. 5 is a method for storing a file object using the file system of FIG. 4.

FIG. 6 is a method for retrieving a document using the file system of FIG. 4.

FIG. 7 illustrates the structure of yet another file system.

FIG. 8 is a method for storing a file object using the file system of FIG. 7.

FIG. 9 is a method for retrieving a document using the file system of FIG. 7.

Like reference symbols in the various drawings indicate like elements.

DETAILED DESCRIPTION

A computer file system is the structure that governs how file objects are named and where they are placed logically for storage and retrieval. File objects are simply data items that can be stored and retrieved, such as text files, image files, sound files, video files, and HTML files, for example. Common operating systems, such as UNIX®, Linux®, IBM® AIX, Compaq® True64, Sun Solaris®, HP® UX, Microsoft MS-DOS®, Microsoft Windows®, IBM®OS/2, and Apple Macintosh®, all have file systems that place file objects in a hierarchical tree structure. A file is placed in a directory or subdirectory at a desired place in the tree structure. File systems also specify conventions for naming file objects. These conventions include a maximum number of characters in a name, which characters can be used, how long a file name suffix (if needed) can be, and how many file objects can be stored per directory or subdirectory. A file system also includes a format for specifying a path to a file through the structure of directories.

Our method implements hashing techniques into a computer file system, such as a Unix-based file system, to produce a high-performance file system. Hashing involves employing a mathematical function, known as a hash function, to transform a string of text characters into a generally shorter, fixed-length hash value that represents the original string. This hash value is typically in decimal or hexadecimal format. Hashing can be used to index and retrieve file objects in a database management system because it is faster to find the file object using the shorter hash value than to find it using the original string. In one method hashing is used in a file system to store and retrieve a large volume of documents without a need for a database management system. Our high-performance file system is self-contained.

Our file system can be implemented on a hard disk storage device. The hard disk storage device can be attached to a network and function as a repository for file objects that are stored and retrieved by the network. Because the file system is self-contained, a number of different servers running on hardware from completely different manufacturers can access and use the same hard disk storage device and high-performance file system.

When implemented on a hard disk storage device, our file system is capable of positioning the read/write heads of the hard disk at the beginning of a file object with a generally predictable number of directory lookups. The file system can also minimize a number of file lookups required to locate a file object that is stored on the hard disk storage device. This improves the efficiency of the file system and minimizes the time required for storage and retrieval of file objects.

In FIG. 1, a structure of a file system 100 is shown. File system 100 includes a root directory 102. In a computer file system that is organized as a hierarchy or tree, the root directory is the top directory that includes all other directories. In Unix-based as well as in other operating systems, the root directory is simply represented by a forward slash ("/"). In systems such as Microsoft Windows®, the root directory is represented by a backslash ("\").

The root directory 102 includes one or more subdirectories 104. The subdirectories 104 are where the file objects are stored in the, file system 100. Each subdirectory 104 can hold a large number of file objects 106, often up to 32k (32,768) or 64k (65,536) file objects, depending on parameters set up by the operating system being used. For instance, most Unix-based file systems allow for 64k file objects per subdirectory, while some Unix-based systems, such as some versions of Linux, allow for only 32k file objects per subdirectory. In a business context where all users are accessing data stored on the same file system 100, each business department can have its own subdirectory 104 for storing its file objects. For example, the file system 100 can include an "engineering" subdirectory, a "marketing" subdirectory, and a "human resources" subdirectory. Each department within the business would generally be allowed to store file objects only within its own subdirectory.

In FIG 2, a process 200 for storing a file object using the file system 100 includes the file system receiving a file object to be stored (202). The file object has a name or title that is provided by a user or another program, such as a web server program. Process 200 applies a hash function to the name of the file object to generate a hash value (204). This hash value is associated with the file object. Process 200 stores the file object in an appropriate subdirectory and identifies the file object by its hash value (206). This is shown where multiple hash values are listed below each subdirectory. There are a maximum of n hash values 106 within the subdirectory 104, a value of n being set by the operating system. As mentioned above, in a Unix-based file system, the value of n will generally be either 32k or 64k. Because there will always be a number of system files created in each subdirectory, the value of n will never be exactly 32k or 64k.

In FIG. 3, a process 300 for retrieving a document using the file system 100 includes the file system 100 receiving a request for a file object that is stored (302). A user or a program provides the name of the file object. Again, this program can be a web server program. Process 300 applies a hash function to the name of the file object to generate a hash value (304). Process 300 retrieves the file object from the appropriate subdirectory using the generated hash value (306). The retrieved file object can then be delivered to the user or the program.

In FIG. 4, a file system 400 includes a root directory 402. The root directory 402 includes one or more subdirectories 404. These subdirectories 404 can be associated with certain business units within a company, such as engineering, marketing, and human resources for example. Each subdirectory, in turn, contains a number of hash slots 406. For clarity, only the hash slots 406 for the subdirectory 404 labeled "Subdirectory 2/" are shown. Each of the subdirectories 404, however, will include their own set of hash slots 406. Hash slots 406 are simply further subdirectories within each subdirectory 404, and it is within these hash slots 406 that the file objects are stored.

The hash slots 406 are given fixed-length hexadecimal values as names. There is a hash slot 406 provided for each and every hexadecimal value within a range that starts at the lowest possible hexadecimal value for the fixed length (which is all zeros) and ends at the highest possible hexadecimal value for the fixed length (which is all f's). The number of hash slots 406 provided within a subdirectory 404 is therefore dependent on that fixed-length. For instance, if the hash slots are given one-digit hexadecimal values, there will be sixteen hash slots that are labeled from 0 to f (e.g., 0, 1, 2, 3, 4, 5, 6, 7, 8, 9, a, b, c, d, e, and f). If the hash slots are given two-digit hexadecimal values, there will be 256 hash slots that are labeled from 00 to ff. Similarly, three-digit hexadecimal values yield 4096 hash slots that are labeled from 000 to fff, and four-digit hexadecimal values yield 65,536 hash slots that are labeled from 0000 to ffff. Four-digit hexadecimal names cannot be used in most Unix-based systems because each subdirectory 404 can only hold up to 64 k (65,536) file objects, and because several of these objects will consist of system files, there is not enough remaining capacity to handle all of the 65,536 hash slots. For Unix-based systems that can hold more than 64 k objects per subdirectory, however, the four-digit hexadecimal names can be used.

The file system 400 uses three-digit hexadecimal names for each of the hash slots 406. Accordingly, there are 4,096 hash slots 406 in FIG. 4 that are labeled from "000" to "fff". The use of these 4,096 hash slots 406 greatly increases the capacity of the subdirectories 404 in the file system 400. For example, in Unix-based systems that allow for 32 k file objects per subdirectory, if each subdirectory 404 includes 4,096 hash slots, then each subdirectory can hold over 134 million file objects. And in Unix-based systems that allow for 64 k file objects per subdirectory, that capacity increases to over 268 million file objects.

In FIG. 5, a process 500 for storing a file object using the file system 400 includes the file system 400 receiving a file object to be stored in a particular subdirectory (502). For example, a file object from a user in the marketing department will generally be placed in the marketing subdirectory. The file object will have a name or title that is provided by a user or another program, such as a web server program. Process 500 applies a hash function to the name of the file object to generate a hash value in hexadecimal format (504). This hash value is associated with the file object and generally consists of three or more hexadecimal characters. Process 500 selects a hash slot within the subdirectory that has a three-digit hexadecimal name that matches the first three digits of the hash value of the file object (506). The first three digits of the hash value can be any hexadecimal number between 0x000 and 0xfff, which is why it is important to provide a hash slot for every possible three-digit hexadecimal value in each subdirectory. Process 500 stores the file object in the selected hash slot and identifies the file object by its hash value (508). This is shown, where multiple hash values 408 are listed below each hash slot 406. The hash values contained within each hash slot begin with the same three digits as the hexadecimal name of the hash slot. There are a maximum of n hash values within each hash slot 406, the value of n being set by the operating system. Again, in a Unix-based file system, the value of n will generally be a value up to either 32 k or 64 k, depending on the operating system used.

In FIG. 6, a process 600 for retrieving a file object using the file system 400 includes the file system receiving a request for a file object that is stored (602). A user or a program provides the name of the file object. Again, this program can be a web server program. Process 600 applies a hash function to the name of the file object to generate a hash value that is in hexadecimal format (604). Process 600 selects the hash slot that has a three-digit hexadecimal name that matches the first three digits of the hash value of the file object (606). Process 600 retrieves the file object from the selected hash slot using the generated hash value (608). The retrieved file object can then be delivered to the user or the program.

The use of hashing in the file systems enables the file objects to be stored in a more evenly distributed manner among the hash slots. If the hash functions are appropriately chosen, the hash values that are generated by the hash function will be statistically random and dissimilar from each other. As such, the distribution into the different hash slots is very even and over time each of the hash slots should hold roughly the same amount of file objects.

In some software environments, several file objects may be used collectively to form a single document. A "document" can include separate file objects for text, graphics, sound, HTML coding, spreadsheets, and other data. For example, an internet home page for a business can be a single document that includes separate file objects that contain the text of the home page in several languages, graphics associated with the home page, sound files to be played when the home page is viewed, and the HTML coding necessary to render these file objects in a web browser. These types of file objects should be kept together in a file system as they are generally stored and retrieved together, and as they all generally share a common document name. The document name is an abstract name that refers collectively to all of the file objects that form the document. The file objects each have their own file names as well. The group of file objects are stored and retrieved using the abstract document name.

In FIG. 7, a file system 700 is used for storing documents that are formed from several file objects. File system 700 includes a root directory 702. The root directory 702 includes one or more subdirectories 704. As in the file systems described above, these subdirectories can be associated with certain business units within a company, including but not limited to departments such as engineering, marketing, and human resources. Each subdirectory, in turn, contains a number of hash slots 706. For clarity, FIG. 7 only illustrates the hash slots 706 for the subdirectory 704 labeled "Subdirectory 2/". Each of the subdirectories 704, however, will include their own set of hash slots 706.

As described with reference to the file system 400, the hash slots 706 of file system 700 are given fixed-length hexadecimal values as names. There is a hash slot 706 provided for every hexadecimal value within a range that starts at the lowest possible hexadecimal value for the fixed length (consisting of all zeros) and ends at the highest possible hexadecimal value for the fixed length (consisting of all f's). The file system 700 uses three-digit hexadecimal names for each of the hash slots 706. Accordingly, there are 4,096 hash slots 706 in FIG. 7 that are labeled from "000" to "fff".

Within each hash slot 706 are a number of document subdirectories 708. Each document subdirectory 708 is created for a document that is being stored within the hash slot 706, and the document subdirectory 708 is given the same name as the document. For instance, if a document entitled "Doc 1" is to be stored within a hash slot 706, a document subdirectory 708 is created within the hash slot 706 that is named "Doc 1". All of the file objects that form the document entitled "Doc 1" are collectively stored in that document subdirectory 708. If the document subdirectory 708 already exists, the file objects are stored in the existing document subdirectory 708 and the file system 700 does not have to create a new document subdirectory 708.

Each hash slot 706 also includes a subdirectory 710 that is used as an extension area. The extension area subdirectory 710 can be used when the hash slot 706 has reached its capacity and more storage space is needed. Within the extension area subdirectory 710, a new set of hash slots are created to store documents in the same manner as hash slots 706. When the extension area subdirectory 710 is used, another extension area subdirectory is created within subdirectory 710 for later use when subdirectory 710 reaches its capacity. Each hash slot 706 includes an extension area subdirectory 710.

In FIG. 8, a process 800 for storing a document that includes multiple file objects using the file system 700 includes the file system 700 receiving a document to be stored in a particular subdirectory (802). Again, this subdirectory can correspond to a subdirectory used for a particular business unit. The document will have a name or title that is provided by a user or another program, such as a web server program. Process 800 applies a hash function to the name of the document to generate a hash value in hexadecimal format (804). This hash value is associated with the document and generally includes three or more hexadecimal characters. The hash value is used primarily to determine which hash slot to store the document in. Process 800 selects a hash slot within the subdirectory that has a three-digit hexadecimal name matching the first three digits of the hash value of the document (806). Process 800 generates a document subdirectory within the selected hash slot, and that document subdirectory is given the same name as the document to be stored (808). As explained above, if the document name is "Doc 1", then the name of the document subdirectory is "Doc 1". Process 800 stores the file objects that form the document within the newly created document subdirectory (810). This is shown in FIG. 7 for the document entitled "Doc 1" that is stored in the hash slot 000.

In FIG. 9, a process 900 for retrieving a document that includes multiple file objects using the file system 700 includes the file system receiving a request for a document that is stored (902). A user or a program, such as a web server program, provides the name of the document. Process 900 applies a hash function to the name of the document to generate a hash value that is in hexadecimal format (904). Process 900 selects the hash slot that has a three-digit hexadecimal name matching the first three digits of the hash value of the document (906). Process 900 goes into the selected hash slot and locates a document subdirectory that has the same name as the document being retrieved (908). Process 90 retrieves all of the file objects that form the document from the document subdirectory (910) and delivers them to the user or the program.

In another embodiment, the document subdirectories 708 of FIG. 7 can be named using the hash value generated from the document name, rather than using the actual document name. In this embodiment, the methods 800 and 900 will use the hash value of the document name when creating or locating the document subdirectory.

Although the methods of the invention are described as being carried out using a hexadecimal hash value, the methods can be performed using hash values generated using other base systems, including a decimal system or a binary system. Hashing allows for an efficient method by which to evenly distribute the file objects among the various hash slots. The use of hashing and hash slots also results in efficient retrieval of the file objects, because the hash slot containing the file object is quickly identified by the hash value of the file object.

In yet another embodiment of the invention, if the capacity of the file system 400 or 700 needs to be increased, the hash slots can be renamed from a three-digit hexadecimal name to a four-digit hexadecimal name. This will increase the number of hash slots from 4,096 to 65,535. Accordingly, the number of file objects that can be stored will increase drastically. Of course, this embodiment assumes that the file system being used allows its subdirectories to hold greater than 64 k file objects. Once the number of hash slots is increased, the stored file objects will have to be rehashed and restored in the appropriate hash slots.

The hash functions used to generate the hash values should not produce the same hash value from two different file names. If it does, this is known as a collision. Hash functions that offer a lower risk of collision are more appropriate for use with the invention. If the users or programs that are accessing the file system of the invention are capable of generating unique names for the file objects, the risk of a collision decreases. In the event a collision occurs, the file system of the invention can warn the user or the program that the file being stored is about to overwrite an existing file object, and the user or the program can then take action to either rename the file object or store it elsewhere.

Examples of hash functions that can be used in the file systems of the invention to generate hash values include many known algorithms. One such algorithm is called the division-remainder method. In this algorithm, the number of file objects to be stored in the table is estimated. That number is then used as a divisor into each original value to extract a quotient and a remainder. The remainder is the hashed value. Another algorithm is called folding. This method divides the original value (digits in this case) into several parts, adds the parts together, and then uses the last four digits (or some other arbitrary number of digits that will work) as the hashed value. Radix transformation is another algorithm. Here, the value is digital, and the number base (or radix) can be changed resulting in a different sequence of digits. For example, a decimal numbered key could be transformed into a hexadecimal numbered key. High-order digits could be discarded to fit a hash value of uniform length. Yet another algorithm is called digit rearrangement. This is simply taking part of the original value such as digits in positions 3 through 6, reversing their order, and then using that sequence of digits as the hash value.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    receiving multiple distinct requests to store multiple distinct file objects in a first directory in a hierarchical file system, each distinct file object having a respective distinct file name;
    for each distinct file object, hashing the respective file name of the file object to generate a respective file hash value character string, where each of the respective file hash value character strings has an identical common character substring at a predetermined character string position;
    selecting one subdirectory of the first directory, the one subdirectory having a name that is the same as the common character substring; and
    storing all of the multiple file objects in the one selected subdirectory of the first directory, instead of in the first directory as requested.

2. The method of claim 1, wherein each of the file hash value character strings is a hexadecimal value.

3. The method of claim 1, wherein each of the file hash value character strings is a decimal value.

4. The method of claim 1, further comprising naming the respective file objects in the one selected subdirectory by the respective file hash value character strings.

5. A method comprising:
    receiving a request indicating a file name of a file object to be retrieved from a first directory of a hierarchical file system;
    hashing the file name to generate a respective file hash value character string, where the file hash value character string has a character substring in common with at least one other distinct file object in the first director, and where the common character substring is at a predetermined character string position;
    selecting one subdirectory of the first directory, the one subdirectory having a name that is the same as the common character substring; and retrieving the file object from the selected subdirectory of the first directory, instead of from the first directory as requested, the file object being retrieved from among multiple distinct file objects stored in the selected subdirectory.

6. The method of claim 5, wherein the file hash value character string is a hexadecimal value.

7. The method of claim 5, wherein the file hash value character string is a decimal value.

8. The method of claim 5, wherein retrieving the file object comprises retrieving the file object that is named in the selected subdirectory by the file hash value character string.

9. A method comprising:
  generating subdirectories within a first directory of a hierarchical file system;
  associating each subdirectory with a corresponding name, each subdirectory having a name that is different from that of every other subdirectory within the first directory of the file system;
  receiving multiple distinct requests to store multiple distinct file objects in the first directory of the file system, each distinct file object having a respective distinct file name;
  for each distinct file object, hashing the respective file name of the file object to generate a respective file hash value character string, where each of the respective file hash value character strings has an identical common character substring at a predetermined character string position;
  selecting one subdirectory of the first directory having the name that is the same as the common character substring; and
  storing all of the multiple file objects in the one selected subdirectory of the first directory, instead of in the first directory as requested, and identifying the file object in the first directory by the file hash value character string.

10. The method of claim 9, wherein the name of the selected subdirectory comprises a hexadecimal value and each of the file hash value character strings comprises a hexadecimal value.

11. The method of claim 9, wherein the selecting comprises selecting the subdirectory having the name that as a character string matches at least a first portion of the respective file hash value character string.

12. The method of claim 9, wherein the name of the selected subdirectory comprises a decimal value and each of the file hash value character strings comprises a decimal value.

13. The method of claim 9, wherein the subdirectories within the first directory are hash slot subdirectories, the method further comprising:
  receiving a request to store a document in the first directory of the file system, the document having a distinct document name;
  hashing the document name of the document to generate a respective document hash value character string, where the document hash value character string has a common character substring, the common character substring having a character substring in common with at least one other distinct document in the first directory, and where the common character substring is at a predetermined character string position;
  selecting one hash slot subdirectory of the first directory having the name that is the same as the common character substring;
  generating a document subdirectory within the selected hash slot subdirectory;
  identifying the document subdirectory, within the selected hash slot subdirectory, by the document name of the document, where the name of each document to be stored corresponds to the name of exactly one document subdirectory; and
  storing the document in the document subdirectory, instead of in the first directory as requested, and identifying the document in the first directory by the document hash value character string.

14. The method of claim 13, wherein the document comprises one or more file objects, and all of the file objects are stored in the document subdirectory.

15. The method of claim 13, wherein each hash slot subdirectory has a name that as a character string comprises a three-digit hexadecimal value ranging from 000 to fff.

16. The method of claim 13, farther comprising generating an extension area subdirectory within each hash slot subdirectory.

17. A method comprising:
  receiving a request to retrieve a document having a document name from a first directory of a hierarchical file system;
  hashing the document name of the document to generate a respective document hash value character string, where the document hash value character string has a common character substring, the common character substring having a character substring in common with at least one other distinct document in the first directory, and where the common character substring is at a predetermined character string position;
  selecting one hash slot subdirectory, within the first directory of the file system, having a name that is the same as the common character substring;
  identifying a document subdirectory, within the selected hash slot subdirectory, that has a name that corresponds to the name of the document to be retrieved, where the name of each document to be retrieved corresponds to the name of exactly one document subdirectory; and
  retrieving, from the identified document subdirectory, instead of from the first directory as requested, a document that is identified in the first directory by the document hash value character string.

18. The method of claim 17, wherein the document comprises one or more file objects, and all of the file objects are retrieved from the document subdirectory.

19. The method of claim 17, wherein the hash slot subdirectory has a name that as a character string comprises a three-digit hexadecimal value.

20. The method of claim 17, wherein the document hash value character string comprises a hexadecimal value.

21. The method of claim 17, wherein selecting the hash slot subdirectory comprises selecting a hash slot subdirectory having the name that as a character string matches a first three digits of the respective document hash value character string.

22. The method of claim 1, wherein each subdirectory of the first directory has a name that is different from that of every other subdirectory of the first directory.

23. The method of claim 22, wherein each value in a continuous range of fixed-length values in a hexadecimal or decimal format is a name of one of the subdirectories of the first directory.

24. The method of claim 5, wherein each subdirectory of the first directory has a name that is different from that of every other subdirectory of the first directory.

25. The method of claim 24, wherein each value in a continuous range of fixed-length values in a hexadecimal or decimal format is a name of one of the subdirectories of the first directory.

26. The method of claim 9, wherein each subdirectory within the first directory has a name that is different from that of every other subdirectory within the first directory.

27. The method of claim 26, wherein each value in a continuous range of fixed-length values in a hexadecimal or decimal format is a name of one of the subdirectories within the first directory.

28. The method of claim 17, wherein each hash slot subdirectory within the first directory has a name that is different from that of every other hash slot subdirectory within the first directory.

29. The method of claim 28, wherein each value in a continuous range of fixed-length values in a hexadecimal or decimal format is a name of one of the hash slot subdirectories within the first directory.

30. A computer program product, tangibly embodied in a machine-readable storage device, the computer program product comprising instructions operable to cause a data processing apparatus to:

receive multiple distinct requests to store multiple distinct file objects in a first directory in a hierarchical file system, each distinct file object having a respective distinct file name;

for each distinct file object, has the respective file name of the file object to generate a respective file hash value character string, where each of the respective file hash value character string has an identical common character substring at a predetermined character string position;

select one subdirectory of the first directory, the one subdirectory having a name that is the name as the common character substring; and store all of the multiple file objects in the one selected subdirectory of the first directory, instead of in the first directory as requested, and identify the file object in the first directory by the file hash value character string.

31. The computer program product of claim 30, further comprising instructions operable to cause the data processing apparatus to:

generate subdirectories within the first directory of the file system; and associate each subdirectory with a corresponding name, each subdirectory having a name that is different from that of every other subdirectory within the first directory of the file system.

32. The computer program product of claim 30, wherein the subdirectories within the first directory are hash slot subdirectories, the computer program product further comprising instructions operable to cause the data processing apparatus to:

receive a request to store a document in the first directory of the file system, the document having a distinct document name;

hash the document name of the document to generate a respective document hash value character string, where the document hash value character string has common character substring; the common character substring having a character substring in common with at least one other distinct document in the first directory, and where the common character substring is at a predetermined character string position;

select one hash slot subdirectory of the first directory having the name that is the same as the common character substring;

generate a document subdirectory within the selected hash slot subdirectory;

identify the document subdirectory, within the selected hash slot subdirectory, by the document name of the document, where the name of each document to be stored corresponds to the name of exactly one document subdirectory; and store the document in the document subdirectory, instead of in the first directory as requested, and identify the document in the first directory by the document hash value character string.

33. The computer program product of claim 32, wherein the document comprises one or more file objects, and all of the file objects are stored in the document subdirectory.

34. The computer program product of claim 30, wherein each subdirectory of the first directory has a name that is different from that of every other subdirectory of the first directory.

35. The computer program product of claim 34, wherein each value in a continuous range of fixed-length values in a hexadecimal or decimal format is a name of one of the subdirectories of the first directory.

36. A computer program product, tangibly embodied in a machine-readable storage device, the computer program product comprising instructions operable to cause a data processing apparatus to:

receive a request indicating a file name of a file object to be retrieved from a first directory of a hierarchical file system;

hash the file name of the file object to generate a respective file hash value character string, where the file hash value character string has a common character substring, the common character substring having a character substring in common with at least one other distinct file object in the first directory, and where the common character substring is at a predetermined character string position;

select one subdirectory of the first directory, the one subdirectory having a name that is the same as the common character substring; and retrieve the file object from the selected subdirectory of the first directory, instead of from the first directory as requested, the file object being retrieved from among multiple distinct file objects stored in the selected subdirectory.

37. The computer program product of claim 36, wherein the subdirectories of the hierarchical file system are hash slot subdirectories, the computer program product further comprising instructions operable to cause the data processing apparatus to:

receive a document name of a document to be retrieved;

hash the document name of the document to generate a respective document hash value character string, where the document hash value character string has a common character substring; the common character substring having a character substring in common with at least one other distinct document in the first directory, and where the common character substring is at a predetermined character string position;

select one hash slot subdirectory having a name that is the same as the common character substring;

identify a document subdirectory, within the selected hash slot subdirectory, that has a name that corresponds to the document name of the document to be retrieved, where the name of each document to be retrieved corresponds to the name of exactly one document subdirectory; and
retrieve, from the identified document subdirectory, a document that is identified in the first directory by the document hash value character string.

38. The computer program product of claim 37, wherein the document comprises one or more file objects, and all of the file objects are retrieved from the document subdirectory.

39. The computer program product of claim 36, wherein each subdirectory of the first directory has a name that is different from that of every other subdirectory of the first directory.

40. The computer program product of claim 39, wherein each value in a continuous range of fixed-length values in a hexadecimal or decimal format is a name of one of the subdirectories of the first directory.

41. The method of claim 1, wherein the first directory is a subdirectory of a root directory of the file system.

42. The method of claim 5, wherein the first directory is a subdirectory of a root directory of the file system.

43. The method of claim 9, wherein the first directory is a subdirectory of a root directory of the file system.

44. The method of claim 17, wherein the first directory is a subdirectory of a root directory of the file system.

45. The computer program product of claim 30, further comprising instructions operable to cause the data processing apparatus to identify the file object that is stored in the selected subdirectory of the first directory by the file hash value character string.

46. The computer program product of claim 32, further comprising instructions operable to cause the data processing apparatus to identify the document that is stored in the document subdirectory by the document hash value character string.

47. The computer program product of claim 36, comprising instructions operable to cause the data processing apparatus to retrieve the file object that is identified in the first directory by the file hash value character string.

48. A method comprising:
receiving a file object for storage in a first directory of a hierarchical file system, the file object having a distinct file name;
hashing the distinct file name of the file object to generate a respective hash value character string, where the file hash value character string has a common character substring, the common character substring having a character substring in common with at least one other distinct file object in the first directory, and where the common character substring is at a predetermined character string position; and
storing the file object in the first directory and identifying the file object in the first directory by the hash value character string, where the name of the file object in the first directory is the hash value character string.

49. The method of claim 48, wherein the hash value character string is a hexadecimal value or a decimal value.

50. The method of claim 48, wherein the first directory is a subdirectory of a root directory of the file system.

51. A method comprising:
receiving a distinct file name of a file object to be retrieved from a first directory of a hierarchical file system;
hashing the distinct file name to generate a respective hash value character string, where the file hash value character string has a common character substring, the common character substring having a character substring in common with at least one other distinct file object in the first directory, and where the common character substring is at a predetermined character string position; and
retrieving a file object that is identified in the first directory by the hash value character string, where the distinct file name of the file object in the first directory is the hash value character string.

52. The method of claim 51, wherein the hash value character string is a hexadecimal value or a decimal value.

53. The method of claim 51, wherein the first directory is a subdirectory of a root directory of the file system.

54. The method of claim 1, further comprising:
generating a notification for a user or a program before storing the file object in the event a collision occurs, where a collision occurs when the hash value generated by hashing the file name is the same as a hash value previously generated by hashing a different file name so that storing the file object would overwrite a different file object in the selected subdirectory.

55. The method of claim 9, further comprising:
generating a notification for a user or a program before storing the file object in the event a collision occurs, where a collision occurs when the hash value generated by hashing the file name is the same as a hash value previously generated by hashing a different file name so that storing the file object would overwrite a different file object in the selected subdirectory.

56. The computer program product of claim 30, further comprising instructions operable to cause the data processing apparatus to:
generate a notification for a user or a program before storing the file object in the event a collision occurs, where a collision occurs when the hash value generated by hashing the file name is the same as a hash value previously generated by hashing a different file name so that storing the file object would overwrite a different file object in the selected subdirectory.

57. The method of claim 48, further comprising:
generating a notification for a user or a program before storing the file object in the event a collision occurs, where a collision occurs when the hash value generated by hashing the file name is the same as a hash value previously generated by hashing a different file name so that storing the file object would overwrite a different file object in the first directory.

* * * * *

UNITED STATES PATENT AND TRADEMARK OFFICE
CERTIFICATE OF CORRECTION

PATENT NO.         : 7,412,449 B2
APPLICATION NO.    : 10/444509
DATED              : August 12, 2008
INVENTOR(S)        : Hans-Joachim Both Page 1 of 1

It is certified that error appears in the above-identified patent and that said Letters Patent is hereby corrected as shown below:

In column 8, claim 5, line 62 – replace "director" with -- directory --

In column 10, claim 16, line 17 – replace "farther" with -- further --

In column 11, claim 30, line 36 – after "the" replace "name" with -- same --

In column 11, claim 32, line 63 – replace "substring;" with -- substring, --

In column 12, claim 37, line 58 – replace "substring;" with -- substring, --

Signed and Sealed this

Thirtieth Day of December, 2008

JON W. DUDAS
*Director of the United States Patent and Trademark Office*